Dec. 8, 1925.  W. F. RAFFERTY ET AL  1,564,712

CENTRIFUGAL MOLDING APPARATUS

Filed Dec. 3, 1924  2 Sheets-Sheet 1

Inventors
W. F. Rafferty
and O. Williams
By John O. Seifert
Attorney

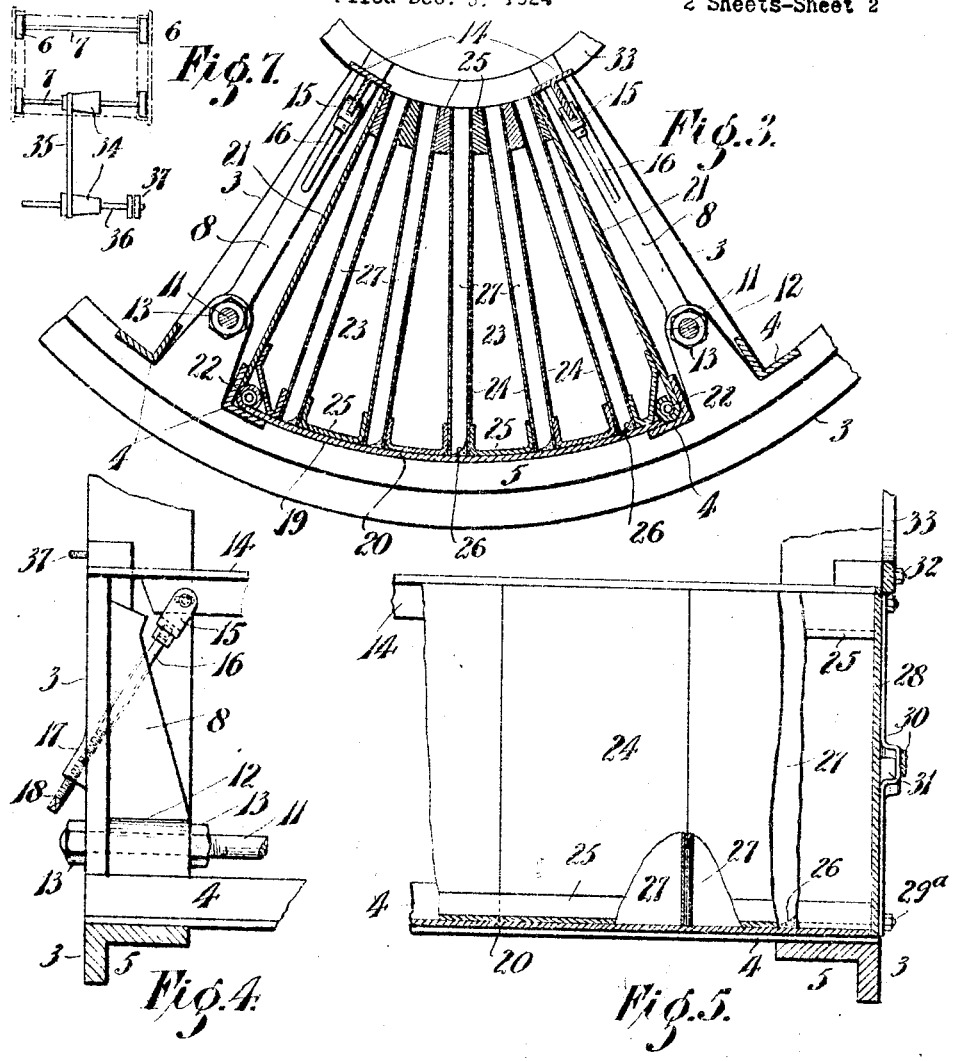

Patented Dec. 8, 1925.

1,564,712

UNITED STATES PATENT OFFICE.

WILLIAM FARELLY RAFFERTY, OF MURRUMBEENA, AND OWEN WILLIAMS, OF JOLIMENT, AUSTRALIA.

CENTRIFUGAL MOLDING APPARATUS.

Application filed December 3, 1924. Serial No. 753,573.

*To all whom it may concern:*

Be it known that we, WILLIAM FARELLY RAFFERTY and OWEN WILLIAMS, both subjects of the King of Great Britain, residing at Murrumbeena and Joliment, in the State of Victoria, Commonwealth of Australia, respectively, have invented new and useful Improvements in Centrifugal Molding Apparatus, of which the following is a specification.

This invention relates to an improved apparatus for the manufacture, by centrifugal action, of roofing tiles, hollow bricks and other like constructional elements of concrete or similar cementitious material.

Although pipes and similar tubular articles of concrete are now manufactured by centrifugal apparatus, there has not been provided any effective means, so far as we are aware, whereby apparatus of this functional character can be employed for the manufacture of roofing tiles, building slabs, hollow bricks and like elements.

The principal object of our invention is to provide apparatus of the centrifugal type by the use of which roofing tiles, slabs, hollow bricks and a variety of articles of similar nature or cognate character can be manufactured satisfactorily and economically. With this object in view, we provide a centrifugal molding apparatus comprising a rotatable frame, which is constructed having two end members rigidly connected together by longitudinal frame bars. These end members are each provided with radial arms, which form segmental shaped apertures wherein mold carriers are removably fitted.

The mold-carriers are constructed having hinged sections, and each of them accommodates a series of mold-formers between which the concrete mixture that is fed into the apparatus is packed and molded by the centrifugal action created by the rotation of said frame. Each of the mold-carriers is provided with detachable end plates, which serve to maintain the hinged sections of said carriers in closed position, and also restrain the mold-formers from dislodgment during the rotation of the apparatus.

The mold-carriers, when fitted within the rotatable frame of the apparatus, are supported upon longitudinal bearer bars having at their ends adjustment screws whereby they can be tightly forced against the edges of said mold carriers to prevent them from having lateral movement while the apparatus is in operation. Metal rings are also secured to the end members of the rotatable frame, and they are arranged to bear against the end plates of the mold-carriers to prevent said carriers from moving longitudinally within the frame.

The apparatus may be mounted upon friction rollers or wheels carried by parallel shafts and driven at required speed through a cone driven or other approved variable-speed gear.

Referring now to the accompanying drawings:

Figure 3 is a sectional view showing on enlarged scale one of the mold-carriers detachably supported within the rotatable frame.

Figure 4 is a detail sectional view of one of the ends of the rotatable frame, showing the tie-rods and also the adjustable bearer bars supporting the mold-carriers.

Figure 5 is a fragmentary view in longitudinal section, illustrating one of the mold-carriers disposed within the frame of the molding apparatus.

Figure 6 is a detail plan view of one of the mold-carriers, showing the arrangement of the mold formers therein.

Figure 7 is a diagrammatic view of the variable-speed drive for the apparatus.

Figure 1:
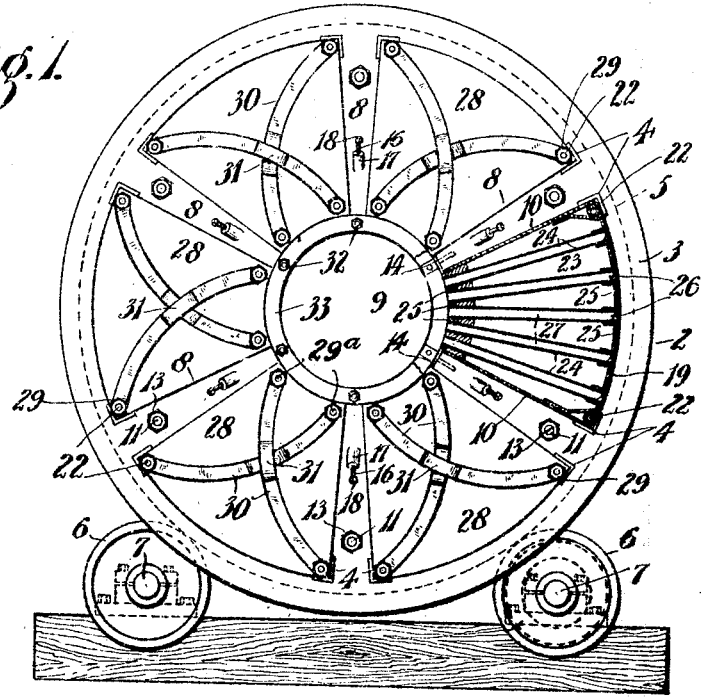
Figure 1 is a view in end elevation of a centrifugal molding apparatus constructed according to the invention, part of the view being shown in section to clearly illustrate the mold-carriers and the mold formers that are supported therein.
Figure 2:
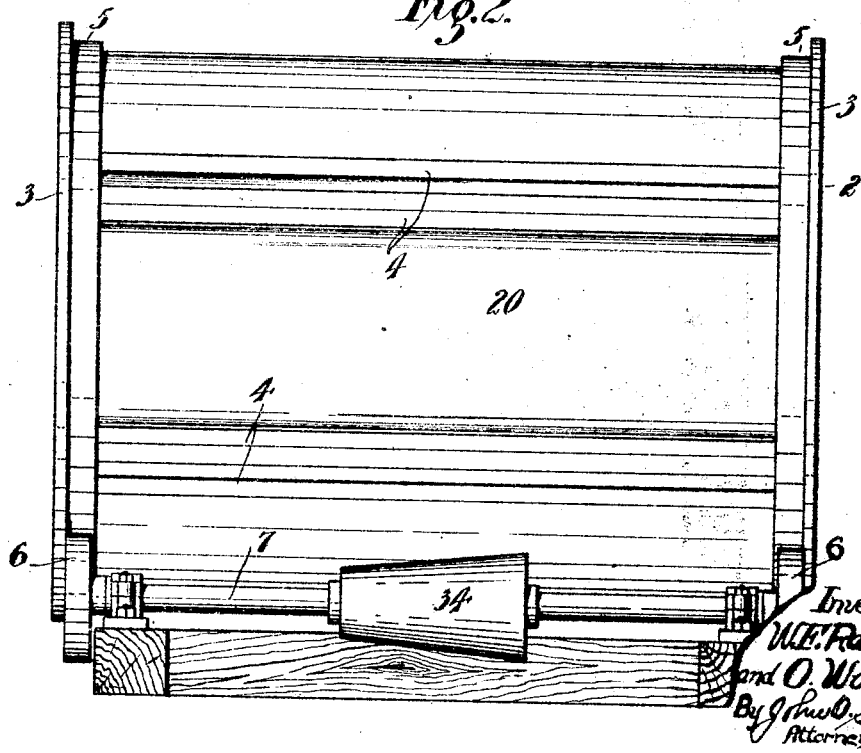
Figure 2 is a side elevation of Figure 1.

A centrifugal molding apparatus according to our invention comprises a rotatable frame 2, provided with end members 3 that are connected together by longitudinal frame bars 4. These frame bars are constructed preferably of angle-section metal, and they have one of their flanges recessed into the said end members 3, so that said flanges will lie flush with the inner periphery of said end members. The end members 3 have angle-section rims 5, that roll upon friction rollers or wheels 6 fitted at the opposite ends of two horizontal and parallel shafts 7. The said end members are also constructed having radial arms 8, which extend inwardly as is shown in Figure 1 and terminate at an approved distance from the centre of the frame 2 to thus provide central apertures 9—one at each opposite end of the apparatus through which the concrete mixture is fed into the apparatus.

The radial arm arrangement also forms segmental shaped apertures 10 at each of the ends of the frame 2, and said arms are connected together by longitudinal tie-rods 11, passing through bosses 12 formed in said arms, and fitted with nuts 13 whereby the distance between the said end members 3 can be conveniently adjusted as required.

Disposed longitudinally within the frame 2, are bearer bars 14 preferably formed of T-section metal and these bars are slidably fitted at their opposite ends upon the inner end portions of the radial arms 8. Attached at opposite ends of said bearer bars 14 are yokes 15 wherein the ends of adjustment screws 16 are fitted. These adjustment screws are threaded through said radial arms and through bosses 17 that are formed on the exterior surfaces of said arms, and they are furnished at their outer ends with square heads 18, whereby they can be conveniently rotated when required to slidably move said bearer bars.

Removably accommodated in the segmental apertures 9 formed in the end members 3 between the radial arms 8 are mold-carriers 19, which slidably bear against the longitudinal frame bars 4. These mold carriers are each constructed having three sections 20, 21—21 hingedly connected together at 22.

The curved section 20 of said mold-carriers bears against the rims 5 of the end members 3 and against the flanges of the longitudinal frame bars 4, while the side sections 21—21 have their inner ends in abutment with the angle-section bearer bars 14.

Arranged in each of the mold-carriers 19 are mold formers 23 which are of triangular shape. Each of the said mold-formers consists of two mold plates 24 arranged at an inclination the one to the other and rigidly connected together at their ends by metal straps 25, or alternatively by wooden blocks or equivalent fastenings. The said mold-formers are radially arranged within the mold-carriers 19, and they are separated from each other by triangular shaped blocks 26 that are secured to the curved sections 20 of said carriers. Said mold-formers are also spaced from each other by flanges—see Figure 6—formed on their edges and arranged to interfit together.

The tiles or other articles are molded in the spaces 27 that are provided between the mold plates 24 of adjacent mold-formers, said spaces 27 being open at their inner ends to the aperture 10 through and into which the concrete mixture is fed by any suitable means.

Each of the mold-carriers 19 has detachable end plates 28 of segmental shape, which are secured in position by means of nuts 29 fitted on the ends of the hinge-pins that are used for the hinged connection between the mold-carrier sections 20 and 21—21. These end plates 28 are further held in position by bolts 29ª that are fitted to sections 21—21 of the mold-carriers, and they are strengthened by the provision on their exterior surface of cross-bars 30 of curved shape, which are appropriately bent at 31 to provide loops for the attachment of a haulage rope or suitable appliance employed to remove the mold-carriers 19 from the apparatus.

Detachably secured by bolts 32 to the inner ends of the radial arms 8 of each of the end members 3 is a ring 33, which overlaps the edges of the end plates 28 of the mold carriers and thus restrains said mold carriers against movement during the rotation of the apparatus.

The machine may be driven by any suitable means, but we prefer to use a variable speed drive of known type such as is shown diagrammatically in Figure 7. This drive consists essentially of two cone pulleys 34 which are connected by a transmission belt 35. One of these cone pulleys is keyed upon one of the parallel shafts 7 and the other cone pulley is fitted upon a counter shaft 36, which is provided with fast and loose pulleys 37 driven by belt transmission from a suitable power shaft.

In operation, the mold-carriers 19 are first removed from the apparatus and their end plates 28 are detached. The mold-formers 23 are then arranged in said carriers, and the end plates 28 are again secured to retain said mold-formers rigidly in correct relationship. The mold-carriers are then inserted through the segmental-shaped apertures 10 into the rotatable frame 2 in such a manner that the hinge portions of said mold-carriers slidably move on the longitudinal frame bars 4 and the edges of the side sections 21—21 rest upon the bearer bars 14.

When the mold-carriers 19 are arranged within the rotatable frame 2, as described, the adjustment screws 16 are rotated to cause said bearer bars 14 to slidably move on the radial arms 8, thus forcing said mold-carriers tightly against the longitudinal frame bars 4. This action restrains the mold carriers against lateral movement, and it also causes the mold-formers to be wedged together with sufficient force that they cannot become dislodged during the rotation of the apparatus, under all operative conditions. The rings 33 are then secured to the radial arms 8 to overlap the edges of the mold-carrier end plates 28 and restrain said mold-carriers against longitudinal movement.

The frame 2 is then rotated at required speed by means of the friction rollers or wheels 6 revolving against the rim 5 of the end members 3, and concrete mixture is fed in required quantities into either or both of the apertures 9. During the rotation of the frame, the concrete mixture so fed is forced by centrifugal action into the spaces between the mold-formers and is packed and compressed to the required extent according to the speed of rotation of said frame.

When the mold spaces 27 have been completely filled with concrete mixture and the mixture has been packed to the required degree, the apparatus is stopped, when one of the rings 33 is removed from the radial arms 8. The adjustment screws 16 are then loosened, when the mold-carriers 19 carrying the molded articles are removed from the apparatus by the use of suitable haulage tackle attached to the cross-bars 30, and a substitute series of mold-carriers is then inserted into the frame to maintain continuity of manufacturing operations.

The mold-carriers removed from the apparatus are dismantled by detaching the end plates 28 and by hingedly folding out the sections 21—21, when the molded articles can be conveniently removed from between the mold formers 23 without danger of fracture or breakage. After all the molded articles have been removed, the mold-carriers are again assembled as hereinbefore described, preparatory to being again inserted into the apparatus.

For the manufacture of hollow bricks or like elements used in building by a centrifugal apparatus according to our invention, the shape of the mold-plates 24 and the blocks 26 will be varied in shape to alter the configuration of the mold spaces 27, while cores may in some cases be used and fitted in said mold spaces 27.

Modifications in constructional details, in design and in the arrangement of the integers of the apparatus to suit the class of article manufactured may be made within the ambit of the invention as defined by the appended claiming clauses.

What we do claim is:—

1. A centrifugal molding apparatus comprising, a rotatably mounted frame, a series of mold-carriers removably supported within said frame, means for restraining said mold-carriers against longitudinal and lateral movement when fitted into said frame, mold-formers in said carriers, means for restraining said mold-formers against movement, means permitting the feeding of concrete mixture into said rotatable frame, and means for rotating said frame.

2. A centrifugal molding apparatus according to claim 1, wherein the mold-carriers are of segmental shape and the mold-formers are arranged radially therein, substantially as described.

3. A centrifugal molding apparatus according to claim 1, wherein each of the mold-carriers comprises a plurality of hingedly connected sections, substantially as described.

4. A centrifugal molding apparatus according to claim 1, wherein the mold-formers are of triangular shape, and each consists of two mold plates rigidly secured at an inclination one to the other, substantially as described.

5. A centrifugal molding apparatus comprising, a rotatable frame, mold-carriers removably supported within said frame, bearer bars in said frame abutting against said mold-carriers, mold-formers in said carriers, and means for slidably moving said bearer bars to cause them to bear tightly against said carriers and restrain said carriers and said mold-formers against movement during the rotation of the frame, substantially as described.

6. A centrifugal molding apparatus according to claim 5, wherein the bearer bars are slidably mounted at their ends and adjustment screws are attached to said bars to enable said bearer bars to be forced against the mold-carriers, substantially as described.

7. A centrifugal molding apparatus comprising, a rotatable frame, end members on said frame, mold-carriers removably supported in said frame, mold-formers radially arranged in said carriers, end plates on said carriers abutting against said end members of the frame, and detachable rings secured to said frame and overlapping said end plates to restrain said mold carriers against longitudinal movement, substantially as described.

8. A centrifugal molding apparatus according to claim 7, wherein rims are formed on the end members of the frame to roll upon friction wheels fitted on parallel shafts, substantially as described.

9. A centrifugal molding apparatus comprising, a rotatably supported frame, end members on said frame, longitudinal frame bars connecting said end members, mold-carriers formed of hingedly connected sections and removably supported in said frame, mold-formers of triangular shape arranged radially in said carriers, bearer bars in said frame abutting against said mold-carriers, and means for adjusting said bearer bars whereby they force said mold carriers against said frame bars and tightly wedge said mold-formers against movement, substantially as described.

10. A centrifugal molding apparatus comprising, a rotatably supported frame, end members on said frame, longitudinal frame bars connecting said end members, radial arms on said end members, tie-rods connecting said radial arms, a central feed aperture in each of said end members, mold-carriers removably supported in said frame between said radial arms, means for restraining said mold carriers against movement, mold-formers in said carriers, means for restraining said formers against movement, end plates on said mold cariers abutting against the end members of said frame, rings detachably secured to said radial arms, and overlapping said end plates, and means for rotating said frame, substantially as described.

In testimony whereof we affix our signatures.

WILLIAM FARELLY RAFFERTY.
OWEN WILLIAMS.